United States Patent [19]
Carron et al.

[11] Patent Number: 5,399,863
[45] Date of Patent: Mar. 21, 1995

[54] DETECTOR FOR THERMAL NEUTRONS UTILIZING ALTERNATING BORON SLABS AND CCD ARRAYS

[75] Inventors: Neal J. Carron, Santa Barbara; Rudolf Goldflam, Goleta, both of Calif.

[73] Assignee: Mission Research Corporation, Santa Barbara, Calif.

[21] Appl. No.: 139,910

[22] Filed: Oct. 19, 1993

[51] Int. Cl.$^6$ .............................................. G01T 3/08
[52] U.S. Cl. ........................... 250/370.05; 250/390.01
[58] Field of Search ............. 250/370.05, 392, 390.01; 257/429

[56] References Cited
FOREIGN PATENT DOCUMENTS
152084  7/1986  Japan ............................ 250/370.05

Primary Examiner—Carolyn E. Fields
Attorney, Agent, or Firm—Donald D. Mon

[57] ABSTRACT

A detector for thermal neutrons comprising a stack of alternatingly arranged boron slabs and CCD arrays. The CCD arrays are receptive to energetic particles generated in the boron slabs by a thermal neutron, which energetic particles escape the boron slab in which they are generated and are captured by the next-adjacent CCD array, the CCD array being provided with circuit and power means to operate it and to read out the charges developed in the CCD arrays. The boron slabs are sufficiently thin that the energetic charged particles can escape, and the CCD arrays are sufficiently thick that the energetic particles will be trapped by them, and a charge will be developed therein which will be detected and measured.

10 Claims, 1 Drawing Sheet

DETECTOR FOR THERMAL NEUTRONS UTILIZING ALTERNATING BORON SLABS AND CCD ARRAYS

FIELD OF THE INVENTION

A detector for thermal neutrons, which can be made in a compact shape and size.

BACKGROUND OF THE INVENTION

Uncharged nuclear particles (neutrons and gammas) are commonly detected in a useful form (i.e., an electric impulse) by first converting them to charged particles via an atomic or nuclear interaction, and then detecting the ionization trail generated by the (secondary) charged particle. Devices designed for uncharged particle detection have been relatively large due to the necessary volume of material needed for particle conversion, the array of photomultiplier tubes, and/or cryogenic cooling apparatus. These complications have precluded the development of a small and compact detector. This invention enables a very efficient detector to be manufactured at a reasonable cost, which can be made so small in size as to fit in a pocket, and which can operate at ambient temperatures for an indefinite length of time with minimal maintenance. Such devices as photomultiplier tubes and any kind of cryo system are unnecessary.

The basic concept of this invention is that, after efficiently converting the thermal neutron to an α particle using thin $B^{10}$, a charged coupled device (CCD) can be used to detect the charged particles. Further, in order to reject false alarms and to permit detection to very low neutron flux levels, a stack of CCD arrays can be arranged so that their output can be processed to disregard higher energy particles of no interest to the intended measurements. Classically a CCD is used to detect visible or IR photons. However, it is also a good charged particle detector, but with poor energy resolution.

Although semiconductor materials (Ge, Si) which are used in CCDs have themselves been employed as radiation detectors, the CCD has not generally been used for charged particle detection because it provides no or poor energy resolution for KeV–MeV energy charged particles. This is the major reason why CCDs have been developed as highly sensitive visible light detection and imaging devices, but not for detection of charged particles. Interaction of charged particles with CCDs is regarded as a source of noise, not something to be detected or measured.

It is an object of this invention to make use of the extreme and well-understood sensitivity of the CCD to ionizing radiation for the detection of thermal neutron reaction products even at low neutron flux levels. Importantly, where a CCD is used for this purpose, neither energy resolution nor imaging is required. Thus simplified, CCD technology enables the construction of a compact, fully solid state, room temperature, neutron detector which is capable of registering nearly every incident neutron.

This device is also amenable to discrimination against energetic background radiation. While a single CCD pixel will stop alpha particles from a neutron of interest, cosmic rays, energetic gamma particles, and charged particles from other sources will penetrate several layers of CCD arrays. This will cause activation in several layers of CCD arrays. Coincidence measurements between adjacent arrays can be used to discriminate these types of particles or rays from those of interest to this detector, thereby to reject false alarms, and to permit detection to very low neutron flux levels.

Also, less energetic charged background particles, as, for example, from radon decay, can be eliminated by encasing the detector in a material which will stop all but the most energetic charged particles from entering the detector, but will have no effect on the neutrons which are to be detected. A very high degree of discrimination is thereby attainable.

BRIEF DESCRIPTION OF THE INVENTION

A detector for thermal neutrons according to this invention is a layered structure, alternating between boron slabs (layers) and CCD arrays. Rectangular CCD arrays are employed, in accordance with conventional practice, and the boron slabs are contiguous to the CCD arrays. According to a preferred construction, the boron slabs may be deposited on the CCD arrays. The arrays and slabs are brought firmly together to form a composite structure.

A CCD indicates a charged particle by providing an electric impulse in the array. These impulses are detected by conversion to a suitable output, the preferred example being a video output on an LCD display. Conventional connections to the CCD array provide the necessary power and timing pulses, which connections and related equipment can be small and portable. Control of the operation and analysis can readily be arranged through a key pad. Suitable output devices are not limited to video. Disk storage, and audio outputs are also useful for field use. The type selected depends on the intended utilization of the detector, its being selected for most convenience in use.

The above and other features of this invention will be fully understood from the following detailed description and the accompanying drawings, in which:

DETAILED DESCRIPTION OF THE INVENTION

Figure 1:
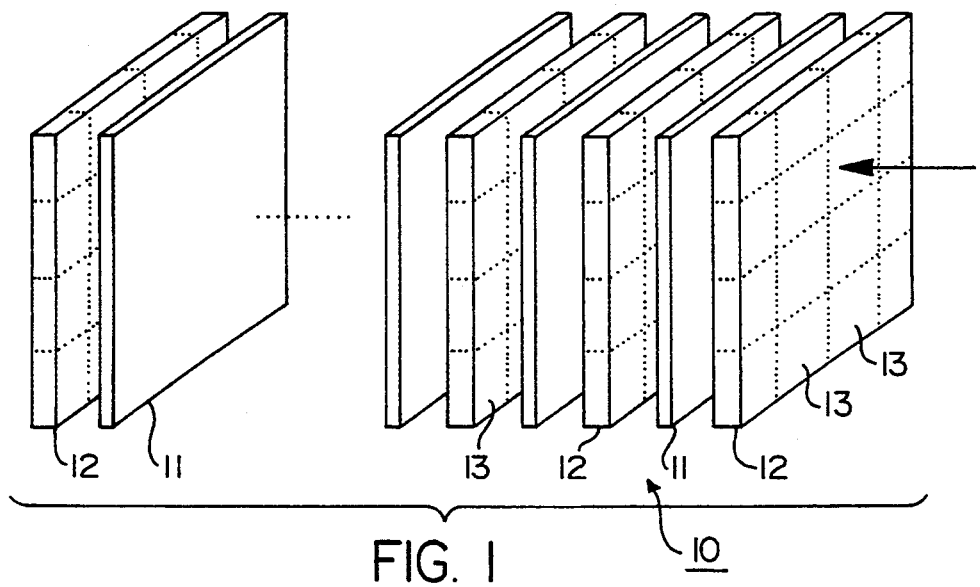
FIG. 1 is an exploded perspective view of the presently-preferred embodiment of a detector according to this invention.
Figure 2:
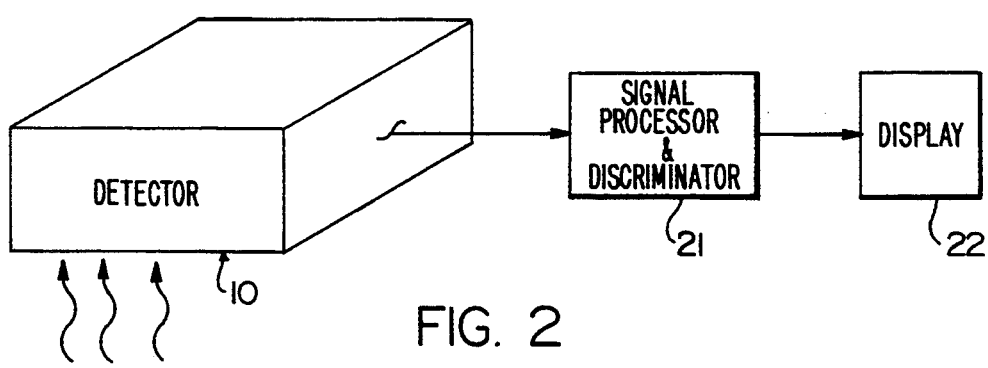
FIG. 2 is a schematic view showing the detector of FIG. 1 incorporated in circuitry for its utilization.

FIG. 1 is an exploded view of the detector 10 itself. It comprises a plurality of boron slabs 11, each adherent to a CCD array 12. These are pressed into a solid block as best shown in FIG. 2.

Cells 13 (called pixels) are schematically shown in FIG. 1. These cells register the charged particles which impinge on them and generate an electrical impulse when such impingement occurs. Leads and connections (not shown) are connected to the CCD arrays according to conventional practice in the utilization of CCDs.

The materials of construction and the dimensions of thickness of the elements of this detector are of considerable importance. It is known that $He^3$ and $B^{10}$ are two stable isotopes with large thermal neutron absorption cross-sections, and which provide a charged particle output. Helium has the larger cross-section of the two, but its incorporation into a detector involves many problems of its own. Therefore the use of boron is preferred and is used in this invention.

As the term "boron" is used herein, it means either pure boron in its naturally occurring isotope ratio (80% $B^{11}$, 20% $B^{10}$), pure boron enriched with $B^{10}$, pure $B^{10}$ (or very highly enriched $B^{10}$), tetra-boron carbide ($B_4C$, which is a black solid with density 2.52 g/cm$^3$), and boron nitride (BN). BN is a common semi-conductor material, but it provides less sensitivity because it has a substantially lesser boron density. Accordingly, pure boron or pure boron enriched with $B^{10}$ are the preferred materials for the slabs, although the term is intended to include all of these examples. It is preferred to utilize highly enriched solid $B^{10}$, whose density is 2.17 g/cm$^3$.

As to the dimension of thickness of the slab, consider that the mean free path of a thermal neutron in solid $B^{10}$ is 0.0019 cm. It follows that a thickness of about $10^{-2}$ cm of $B^{10}$ will stop essentially every thermal neutron. However, after the thermal neutron is absorbed, at least one of the reaction products (a charged particle) must escape from the slab in order to be detected. The pertinent reaction products have the following energies:

$\alpha = 1.776$ MeV
$Li^7 = 1.015$ MeV

The $\alpha$ particle mean range in solid boron is about $6 \times 10^{-4}$ cm, which is only about 1/16 of the thickness needed to stop essentially every thermal neutron. The $Li^7$ mean range is about $2 \times 10^{-4}$ cm. It follows that if one uses a slab thick enough to stop all thermal neutrons, almost none of the charged particles that are produced in it can escape to be detected. As a consequence, the detector would not work if sufficient boron thickness is used in a single slab to stop essentially all thermal neutrons. However, if instead the same total necessary thickness of boron is provided in a substantial number of slabs of lesser thickness, a workable detector can be devised.

If, for example, at least 50 $B^{10}$ slabs (11), each about $2 \times 10^{-4}$ cm thick, sandwiched between 51 CCD arrays (12), are employed, then almost every e particle and many $Li^7$s produced by the nuclear reaction can escape the boron slabs to strike the CCDs and be detected. The entire device will still contain about 0.01 cm thickness of $B^{10}$, which is enough to stop nearly all thermal neutrons. It will have a reduced sensitivity to fast neutrons, but the advantages of the arrangement vastly exceed this minor disadvantage. If a boron material other than highly enriched $B^{10}$ is used, more than 50 layers would be necessary for the same neutron stopping efficiency.

Because these thinner slabs are only on the order of about 2 $\mu$m thick, the boron can be vacuum deposited on the active side of the CCD array. All of the "boron" examples can be deposited in this manner.

The area of the arrays and slabs will be selected to be small enough that the detector will be compact, but still will be large enough to detect desired fluxes in reasonable integration times. A total detector area on the order of about 30 cm$^2$ is readily comprehended. To make neutrons detectors of various sizes, the slabs and CCD arrays can be abutted edgewise to build up areas of any desired extent.

The CCD array will be selected for optimum interaction with the charged particles which the slabs will emit, and for operation at room temperature. For this purpose, a silicon-based CCD is preferred.

A CCD is a metal-oxide-semiconductor charge accumulation device. It is meant to collect the charge from electron-hole pairs created by photon absorption. For visible photons, the semi-conductor of choice is silicon. Also, the relatively high Si band gap (about 1.1 eV) permits operation at room temperature for indefinite periods of time.

None of the $\alpha$ particles from the reactions in the boron slabs will penetrate very deeply into the silicon. Even an $\alpha$ particle which loses negligible energy in the slab will have a range of only about 6 $\mu$m in silicon. It will therefore be absorbed in the surface layer of the CCD. The $Li^7$ range is even shorter—less than 3 $\mu$m.

When the $\alpha$ particle (or the $Li^7$) strikes the CCD, it deposits energy by forming electron hole pairs. Minority carrier diffusion into the quantum well region then contributes to depleting the well. The CCD registers this charge accumulation. For typical size pixels, well depletion saturates at $10^5$ to $10^6$ e–h pairs, corresponding to a total energy deposited of 0.1–1 MeV. Thus the $\alpha$ (or the $Li^7$) will saturate the well. Saturation energy is proportional to pixel area and gate voltage. Charged particle stopping distance is small compared with a typical unit cell size ($\sim 15$ $\mu$m $\times 15$ $\mu$m), so all the energy of the $\alpha$ particle deposits in a single unit cell and will be detected.

Commercial CCDs are available in a variety of sizes, often with more than 100 elements in each direction, and many of them can be used in this invention. In this invention, the number of pixels is less important than the total active CCD area, which should be as large as possible. Pixels 100 $\mu$m $\times$ 100 $\mu$m or larger are acceptable. Special large area arrays can be built if warranted. Typical frame rates are at video speeds—30 frames per second. A simple adder can sum images for 1 sec or more without difficulty, providing good detection probability to fluxes less than 0.1 neutrons/cm$^2$/sec.

Since imaging is not of concern to this detector, linear CCDs may also be utilized. The utility of linear CCDs would depend on a tradeoff of simpler electronics against increased saturation levels. The neutron detection problem itself imposes no pixel shape constraints.

CCD arrays are usually made on a Si substrate about 500 $\mu$m thick, and can be fabricated to 200 $\mu$m or less at higher cost. Thus the entire device may be made to a thickness of about 1 cm (50 elements $\times$ about 200 $\mu$m). A nominal 500 $\mu$m thickness is required for structural strength considerations, a limitation which is eased in a multi-layered device.

Figure 3:
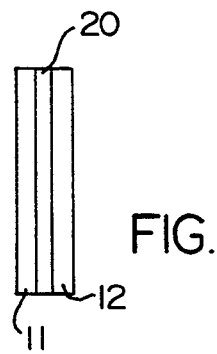
FIG. 3 is an edge view of a modified embodiment of the invention.

If the small boron conductivity (about $5.5 \times 10^{-5}$ mho/m) is a problem, the boron layer 11 can be separated from the CCD 12 by a thin (about 1 $\mu$m) dielectric sheet 20 such as polyethylene, as shown in FIG. 3.

Neutrons will not be absorbed in the Si CCD arrays themselves. Si density (2.33 g/cm$^3$) is $N = 5 \times 10^{22}$ nuclei per cm$^3$, and the absorption cross section for $Si^{28}(n,\gamma)Si^{29}$ is 0.17 barn, giving thermal neutrons a mean free path of about 117 cm, as follows:

$$\lambda(Si) = \frac{1}{N\sigma_a} = 117 \text{ cm}$$

Thus, neutrons will be absorbed only in the boron slabs and not in the CCD arrays.

In the preferred embodiment of the invention, the following reaction is employed:

This reaction is selected because of its large cross-section. However, the invention is not limited to the use of that reaction, instead, although they will not be preferred, a suitable reaction may be considered more generally, the above being the preferred selection, as follows:

n+(low Z stable nucleus)—C+(residual charged nucleus). For example, another suitable reaction within the generally acceptable reactions is:

$n + Li^6 > T + He^4,$ where T is a triton.

In the above reactions, C is any light charged particle, examples being a proton, deuteron, triton, $He^3$ and $\alpha$.

In an alternate configuration, one could implant boron directly in the active Si depletion region, allowing very direct conversion of neutrons to accumulated charge within a CCD. This usually will not be preferred.

In yet another embodiment, the entire layered device is manufactured as a single unit, depositing Si with the conducting gates and insulating layers of the CCD, with alternating layers of boron. This integrated unit would be especially attractive, because the Si substrate could then be kept thin (on the order of 50 $\mu$m), thereby allowing back illumination of the CCD as well, increasing detection efficiency while decreasing detector thickness.

Neutrons of interest create $\alpha$ particles that stop in a single CCD pixel. However, cosmic rays or energetic gammas and charged particles from other sources will penetrate several layers of CCD arrays, and activate multiple pixels in different layers. Then they could be mistaken for charged particles emitted from a boron slab. Coincidence measurements between adjacent arrays can be used to discriminate against energetic charged particles or gammas that penetrate several layers, in order to eliminate them from the measurement. If aligned cells 13 in two or more neighboring CCD arrays receive a charge nearly simultaneously, it can be concluded that this represents something other than a charged particle from a boron slab. This is because a particle from a slab will stop in the nearest CCD array, and will not go on to a next CCD. Therefore a technique for discrimination is available at all fluxes.

In addition, Compton electrons produced by gammas lose energy in Si at a rate of only about 400 eV/$\mu$m, and so would deposit only a few KeV in the CCD depletion region, as opposed to $\alpha$'s which deposit all their energy. Thus, both coincidence between adjacent arrays, and a threshold for energy deposition, are available to discriminate against background gammas and charged particles.

Less energetic background particles can be eliminated by encasing the entire detector in aluminum or in an optimized layered shielding material. About 1 to 2 gm/$cm^2$ of aluminum will stop all but the most energetic charged particles from entering the CCD, with no effect on the desired neutrons. Together with multiple layer anti-coincidence, false alarms could then occur only for those very few background particles of precisely enough energy to penetrate the Al, but which stop in the first CCD layer.

The scheme for utilizing the detector should be evident from the foregoing description of its properties. Because no single slab of boron is thick enough to stop all thermal neutrons, but there is enough total thickness of boron to stop them all somewhere in the stack, it is likely that many or most of the slabs will stop some of them. Because the thickness of each individual slab is kept appropriately small, the charged particle produced in the neutron reaction with boron will be able to escape from that slab, and will be captured by the adjacent CCD array.

It is a simple matter to accumulate the data relating to the total charge on each CCD array and add them together. This requires no more than the conventional controls for operating CCD arrays, and summation means, and this is within the scope of this invention. It is adequate for many uses.

However, a suitably sophisticated system is needed to eliminate false data which could be generated by high energy particles that would not be stopped by the boron slabs, but still would provide a signal on the CCD arrays. The particles generated by a thermal neutron's reaction in the boron slab will go only to the adjacent CCD array. However, the more energetic particles will pass through several CCD arrays. This provides the basis for discrimination. The discriminator circuitry 21—(FIG. 2) will detect the fact of charges in two or more adjacent CCD arrays, in the same position on the arrays. Then these charges in the CCDs can be disregarded in the discriminator circuit, thereby eliminating this spurious data. The remaining data is unique to the thermal neutrons.

The data received in either of these schemes may be displayed by a counter, or by a visual LCD or other display 22. Conventional controls such as off-on, rest, and the like, will also be provided.

For example, any Si based CCD array of suitable thickness can be used together with a boron slab also of suitable thickness. These boron and CCD layers can be separately formed and then stacked, or instead can be formed by any suitable deposition process, or a combination of separate elements of one of them with a deposited layer by the other on it. Thus this invention is amenable to a wide range of materials and constructions, requiring only that the critical thicknesses be maintained as described above.

The discrimator circuitry merely notes the coincidence of charges in adjacent CCDs at identical locations, and segregates that data from the remainder. The design of such circuitry is easily within the ability of a skilled designer of electronic circuitry.

This invention is not to be limited by the embodiments shown in the drawings and described in the description, which are given by way of example and not of limitation, but only in accordance with the scope of the accompanying claims.

We claim:

1. A detector for thermal neutrons comprising a stack of alternatingly arranged boron slabs and CCD arrays, said CCD arrays being receptive to energetic particles generated in the boron slabs by a thermal neutron, which energetic particles escape the boron slab in which they are generated and are captured by the next-adjacent CCD array, the CCD array being provided with circuit and power means to operate it and to read out the charges developed in the CCD arrays, the boron slabs being sufficiently thin that the energetic charged particles can escape, and the CCD array being sufficiently thick that the energetic particles will be trapped by them, and a charge developed therein which is to be detected and measured.

2. A detector according to claim 1 in which the following reaction occurs in the boron slab:

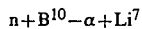

3. A detector according to claim 1 in which said boron is selected from the group consisting of pure naturally occurring boron, pure boron enriched with the $B^{10}$, pure $B^{10}$, tetra-boron carbide, and boron nitride.

4. A detector according to claim 3 in which said boron is either pure natural boron, or pure boron enriched with $B^{10}$.

5. A detector according to claim 1 in which the combined thickness of the boron slabs is at least as large as the mean free path of a thermal neutron in the boron, but the thickness of each individual boron slab is less than the mean free path of the energetic particles produced in the boron slabs, whereby substantially all of the thermal neutrons will be stopped in some one of the boron slabs, and substantially all of the energetic particles will escape the boron slabs to impinge on a CCD array and to be detected.

6. A detector according to claim 1 in which said detector comprises a stack of separately-formed boron slabs and CCD arrays, pressed together in flat adjacency.

7. A detector according to claim 6 in which said detector further includes a dielectric sheet between each boron slab and its adjacent CCD array.

8. A detector according to claim 1 in which said detector is an integral built-up block of deposited CCD arrays and boron layers.

9. A detector according to claim 1 in which a boron layer is applied to each CCD array, and a plurality of them is assembled in a stack to form the detector.

10. A detector according to claim 1 including means to detect energetic particles at substantially the same location in a plurality of adjacent CCD arrays, whereby to discriminate charged particles derived from thermal neutrons from those derived from high energy particles which will not be stopped by the boron slabs.

* * * * *